US008276545B2

(12) United States Patent  
Greeson

(10) Patent No.: US 8,276,545 B2
(45) Date of Patent: Oct. 2, 2012

(54) ANIMAL TREATMENT SYSTEM

(75) Inventor: John S. Greeson, Roswell, NM (US)

(73) Assignee: Dairy Solutions, Inc., Roswell, NM (US)

( * ) Notice: Subject to any disclaimer, the term of this patent is extended or adjusted under 35 U.S.C. 154(b) by 620 days.

(21) Appl. No.: 12/410,981

(22) Filed: Mar. 25, 2009

(65) Prior Publication Data

US 2009/0178626 A1  Jul. 16, 2009

Related U.S. Application Data

(63) Continuation-in-part of application No. 11/458,935, filed on Jul. 20, 2006, now abandoned.

(51) Int. Cl.
*A01K 13/00* (2006.01)
*A61D 11/00* (2006.01)

(52) U.S. Cl. ........ 119/604; 119/601; 119/603; 119/651; 119/666; 119/667

(58) Field of Classification Search .......... 119/600–605, 119/650, 651, 656–659, 665–667, 669; 4/496
See application file for complete search history.

(56) References Cited

U.S. PATENT DOCUMENTS

| | | | | |
|---|---|---|---|---|
| 1,767,560 | A * | 6/1930 | Snyder | 119/667 |
| 2,870,478 | A * | 1/1959 | Schuster | 452/173 |
| 3,173,402 | A * | 3/1965 | Cassel | 119/667 |
| 3,292,185 | A * | 12/1966 | Lucian | 4/615 |
| 3,496,914 | A * | 2/1970 | Cowan | 119/667 |
| 3,602,199 | A * | 8/1971 | Diggs | 119/667 |
| 3,699,928 | A * | 10/1972 | Cowan | 119/667 |
| 3,734,057 | A * | 5/1973 | Lee et al. | 119/163 |
| 3,884,192 | A | 5/1975 | Knapp | |
| 4,782,792 | A * | 11/1988 | Anthony et al. | 119/665 |
| 5,063,880 | A * | 11/1991 | Bouthillier | 119/667 |
| 5,630,379 | A | 5/1997 | Gerk | |
| 5,656,801 | A | 8/1997 | Goren et al. | |
| 5,830,379 | A * | 11/1998 | Tunzi | 249/126 |
| 5,988,113 | A * | 11/1999 | Zhioua et al. | 119/666 |
| 6,029,610 | A * | 2/2000 | Ramsey et al. | 119/651 |
| 6,230,660 | B1 | 5/2001 | Greeson | |
| 6,520,118 | B2 * | 2/2003 | Swiegers et al. | 119/666 |
| 6,563,059 | B2 * | 5/2003 | Lee | 177/177 |
| 6,615,769 | B2 * | 9/2003 | Zhioua | 119/666 |
| 6,651,589 | B2 | 11/2003 | Greeson | |
| 6,739,286 | B2 * | 5/2004 | Vander Veen | 119/673 |
| 6,779,489 | B2 | 8/2004 | Greeson | |
| 6,886,210 | B2 * | 5/2005 | Dean | 15/215 |
| 6,966,276 | B2 * | 11/2005 | Dollar | 119/667 |
| 7,194,980 | B2 * | 3/2007 | Greeson | 119/651 |
| 7,258,079 | B2 * | 8/2007 | Foster et al. | 119/853 |
| 2002/0193346 | A1 * | 12/2002 | Greeson et al. | 514/63 |
| 2005/0005872 | A1 * | 1/2005 | Greeson | 119/665 |
| 2006/0236487 | A1 * | 10/2006 | Dean | 15/215 |
| 2007/0041593 | A1 * | 2/2007 | Marinovich | 381/122 |
| 2007/0074672 | A1 * | 4/2007 | Torgerson et al. | 119/667 |
| 2007/0256362 | A1 * | 11/2007 | Hansen | 49/32 |

OTHER PUBLICATIONS

U.S. Appl. No. 09/844,316, Greeson. U.S. Appl. No. 10/903,318, Greeson.
U.S. Appl. No. 11/458,935, Greeson.

* cited by examiner

*Primary Examiner* — Joseph W Sanderson
(74) *Attorney, Agent, or Firm* — Ray R. Regan

(57) ABSTRACT

An apparatus is provided that includes at least two substantially parallel pressure sensing members adapted to detect location of an animal foot. The apparatus also includes a system for delivering ingredients to the pressure sensing members, and a system for discharging the ingredients on the animal foot.

17 Claims, 12 Drawing Sheets

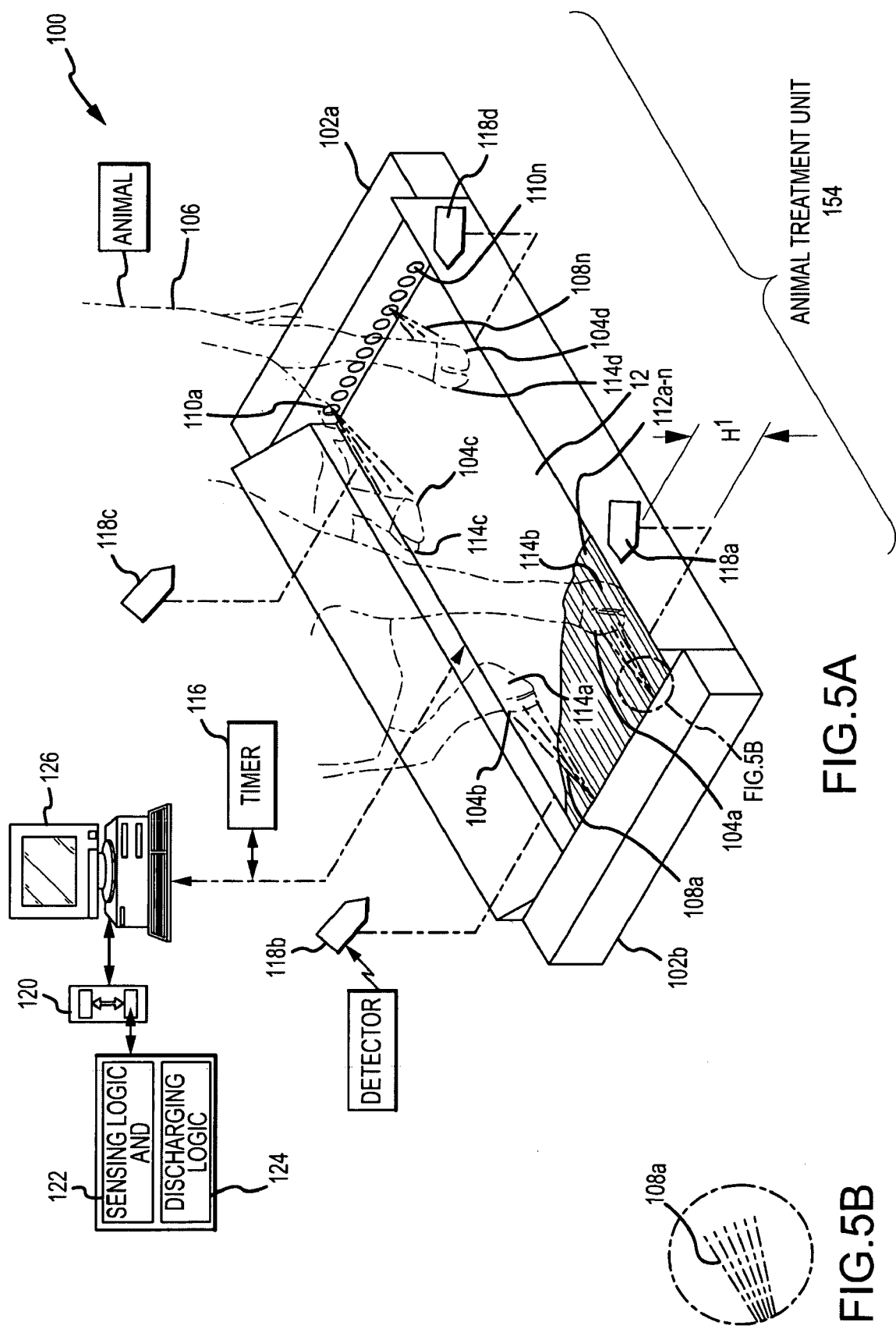

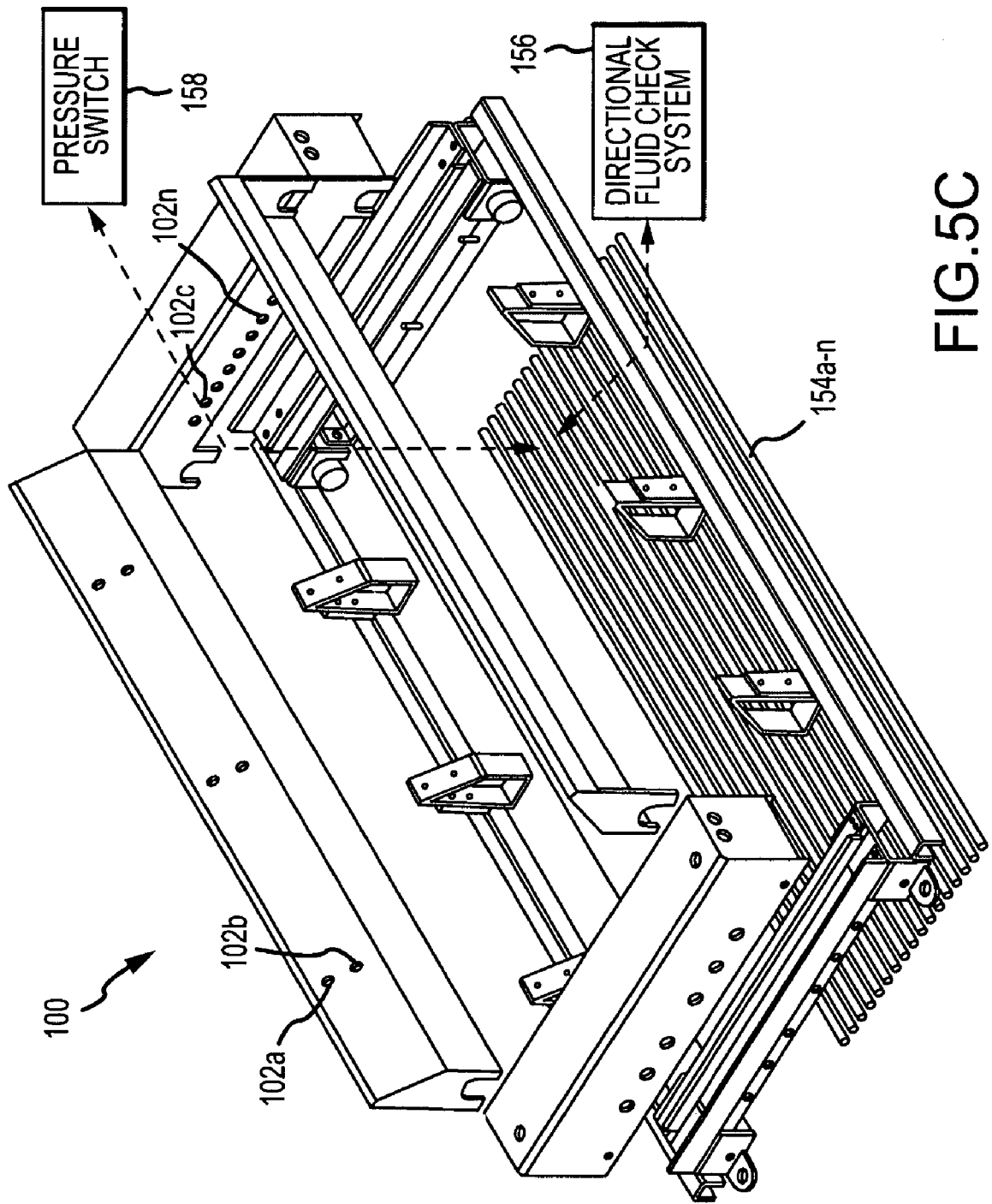

US 8,276,545 B2

ANIMAL TREATMENT SYSTEM

CROSS-REFERENCE TO RELATED APPLICATION

This application is a continuation-in-part from a parent application, application Ser. No. 11/458,935, entitled FOOT TREATMENT SYSTEM, filed on Jul. 20, 2006 ("Parent Application") now abandoned. The specification of the application is incorporated by reference into this document.

FIELD OF TECHNOLOGY

In its broadest sense, the animal treatment system disclosed, illustrated and claimed in this document is useful for selectively applying specific amounts of ingredients on specific anatomical regions of animals. The animal treatment system provides a new and useful system for the treatment of problems associated with animals, such as cows, by treating diseases, infections and injuries, as well as applying specific combinations of preventative ingredients on specific anatomical regions of an animal to promote and develop resistance of the animal to diseases and lacerations, to harden hooves, and to achieve other treatment objectives of animal husbandry.

BACKGROUND

Control and management of insects and other pests on domesticated animals has proven challenging, costly, often elusive, and frequently ineffective. Dealing with pests of the kind described in the U.S. patent application filed by the inventor named in this document, U.S. patent application Ser. No. 10/903,318 filed on Jul. 30, 2004, is an important objective for dairy herdsmen. Pests among dairy herds dramatically impact the economics of animal production and milk production, a commercial industry constituting a significant contribution to the gross national product of the United States. It is estimated that the dairy cattle industry, for example, is produces $38 billion annually. Failure to deal with pests causes a number of problems, including irritations to cows that are so severe that milk production suffers; disease pathogens are transmitted from cow to cow; and a variety of regulatory rules and regulations may be violated by failure to treat such pests. Exemplary solutions for solving problems arising from pests among dairy herds have been provided by the inventor named in this document as shown in U.S. Pat. No. 6,230,660 issued May 15, 2001; U.S. Pat. No. 6,651,589 issued Nov. 25, 2003; U.S. patent application Ser. No. 09/844,316 filed Apr. 26, 2001; U.S. Pat. No. 6,779,489 issued Aug. 24, 2004; and U.S. Pat. No. 7,194,980 B2, issued Mar. 27, 2007 (collectively, "Prior Applications and Patents").

In addition to the problems solved by the Prior Applications and Patents, a wide range of diseases, infections and injuries to the feet and other anatomical regions of animals and mammals, including cattle that are part of dairy herds. In addition to treating diseases, infections and injuries on the feet of dairy cows, for example, it is useful to apply various ingredients for preventative treatment to achieve resistance to diseases and lacerations, to harden hooves to resist physical injury, and to achieve similar and related objectives. Livestock in a dairy herd, for example, are susceptible to forming a variety of warts, abscesses, sole ulcers, foot rot, heel cracks and variations of lesions and infections on their feet and/or hooves, which may individually or collectively cause livestock to suffer lameness, clubbed hooves, loss of body weight, decreased milk production, and decreased rates of conception. In this document the term "animal treatment problems" includes at least such problems, but is not limited in any way.

An exemplary solution to such problems is presented in the co-pending U.S. patent application by the same inventor of the animal treatment system disclosed, illustrated and claimed in this document, namely application Ser. No. 11/458,935 for an ANIMAL FOOT TREATMENT SYSTEM filed Jul. 20, 2006, U.S. Publication No. US/2008/0121189 A1, published on May 29, 2008 ("Parent Application").

While the system, apparatus and methods disclosed, illustrated and claimed in the Parent Application have proven useful for the intended purposes and applications described in that document and drawing figures, additional contributions to the art disclosed, illustrated and claimed in this document provide other optimizations and embodiments in which the principles of operation, with different configurations, result in additional features and uses, and consequently additional advantages, of the animal treatment system disclosed, illustrated, and claimed in this document. As will become evident, none of the currently available suggestions for addressing animal treatment problems is as effective as that disclosed in this document.

Indeed, alternative apparatus and methods suggested as solutions for application of ingredients to animals are potentially hazardous both to humans and to animals. For example, a common way to apply topical solutions to hooves of animals is a form of a bath, footbath, tub, or container (in this document, a "bath") through which an animal walks. Concentrations of ingredients in baths used to chemically treat animal foot problems are often rendered ineffective because of debris deposited in the ingredients in the form of animal waste by livestock passing through the bath. Accordingly, and to insure continued efficacy of a bath, baths need to be regularly cleaned and refilled with fresh ingredients. Unfortunately, the cleaning and refilling of baths is generally a manual chore often ignored. After a short period of time, this results in an inefficacious bath. Therefore, until development of the system shown in this document, applying and maintaining precise concentrations of ingredients has proven problematic.

In addition, bath application methods are comparatively expensive and inefficient. Excessive quantities of expensive chemicals and chemical combinations are used in connection with a bath in an effort to achieve appropriate coverage and treatment. As debris is deposited in the bath, the debris acts to reduce the efficacy of the foot bath solution. That is, as more animals pass through the bath more debris is deposited in the bath and, as the strength of the bath continually degrades, a point is reached where the bath contents are no longer efficacious. Therefore, to compensate for this effect, the chemical concentration in the bath must be provided at a strength sufficient to insure that the contents of the bath will still be efficacious when the last animal traverses the bath. Thus, the concentration of the solution in the bath must be much stronger than required for the first animal passing through bath to be effective for the last animal passing through the bath because of the degrading effect of continuous debris deposition.

Baths in which animals place their feet may also cause pollution and injury to animals and to humans. For example, copper sulfate is commonly used in treating cows. Discharge of copper sulfate from bath treatment systems into adjacent lands may cause significant damage to crop lands. Another chemical used extensively in the dairy industry is formaldehyde. Numerous burns to humans and animals result annually from use of formaldehyde; loss of eyesight and even death among workers have occurred. For these reasons the European Union has called for a ban of its use, a decision made more compelling after formaldehyde was listed as a known carcinogen in the United States. Formaldehyde in comparatively large concentrations in a bath application system may damage feet of cattle. Use of the animal treatment system disclosed in this document eliminates those problems and other problems associated with contamination, pollution and injury caused by excessive concentrations of one or more chemicals in a footbath system, and at the same time decreases the costs of effective applications of ingredients.

For example, studies show that the animal treatment system disclosed in this document may reduce the quantities of expensive chemicals from over 20 ounces per application per animal to approximately 4 ounces per application per animal, resulting in a significant reduction in the use of costly chemicals, and in a significant reduction in potential pollution and accompanying costs.

As indicated, the animal treatment system disclosed in this document is capable of selective discharge and application. A consequence of selective targeting of expensive chemicals reduces the overall costs of contending with animal treatment problems. The animal treatment system of this document, therefore, provides flexibility by allowing use of precise ingredients to treat a precise problem.

One example among many is the treatment of digital dermatitis, also known in the dairy industry as hairy heel warts. Digital dermatitis generally occurs on the back of a cow's rear feet over 90% of the time, but it is known also to occur between the cow's toes and/or claws and on front feet as well. Because the animal treatment system disclosed in this document can selectively target specific anatomical regions of a cow for treatment, studies have shown that chemical usage as a result of the animal treatment system can be reduced by 70-90%. For treating digital dermatitis, the animal treatment system of this document appears to be at least four times more efficient to use, from a cost perspective, than any other known footbath or bath treatment system.

Yet another advantage of the animal treatment system of this document is treatment of varying conditions of an anatomical region during varying cycles of an animal. In a dairy herd environment, the hooves of cows change solidity in direct relationship to the lactation cycle of the cow. The term "lactation cycle" refers to the period during which milk is produced by mammary glands of a cow. A cow entering commencement of a lactation cycle may not have its feet treated for the 2-4 month period, known as the dry period, before calving when she was not being milked and therefore was not passing through the footbath. During that period, a cow's foot may become softer than it was during the lactation cycle when routinely passing through a bath. Softness may later result in development of significant abscesses, ulcers, or erosions that will ultimately have to be treated. Additionally, because cows typically are not exposed to baths during the dry period, certain foot lesions or diseases become more pronounced. Use of the animal treatment system disclosed in this document allows changes in chemical compositions of applications of ingredients to reflect such varying problems unique to the dairy industry, among others.

It is apparent, then, that a need exists in the industry for a new and useful system for treating animal feet and/or hooves that is capable of applying precise amounts of ingredients at precise times during precise lengths of time on such selected anatomical regions of animals to achieve a cost-effective and treatment-effective application of ingredients to overcome animal treatment problems.

SUMMARY

In a broad aspect of the system disclosed, illustrated and claimed in this document, an apparatus is provided that includes at least two substantially parallel pressure sensing members adapted to detect location of an animal foot. The apparatus also includes means connected to the at least two pressure sensing members for discharging ingredients on the foot. Means also are provided for delivering the ingredients to the means for discharging ingredients on the foot.

In another aspect, an animal foot treatment apparatus includes a plurality of substantially parallel pressure sensing members activated and deactivated in such a way that ingredients are dischargeable on the animal foot through at least one dispenser. A delivery system connectable to the plurality of substantially parallel pressure sensing members for delivering the ingredients also is included.

In yet another aspect, a hoof treatment system includes an array of dispensers for discharging treatment ingredients on the hoof. In addition, a plurality of substantially parallel means formed as a mat connectable to the array of dispensers for sensing location of the hoof and for activating discharge of the treatment ingredients on the hoof is included. Also, means for holding and delivering the treatment ingredients to the array of dispensers is provided.

In still another aspect, a method providing a plurality of pressure sensing members includes mounting on the plurality of pressure sensing members a dispenser for discharging ingredients on a foot placed on the plurality of pressure sensing members. The method includes means for activating discharge of the ingredients on the foot. The method also includes connecting to the plurality of pressure sensing members an ingredients delivery system.

In another aspect, a method of operating an animal treatment system includes providing a plurality of substantially parallel pressure sensing members responsive to application of pressure from a foot of the animal and responsive to removal of pressure from a foot of an animal, as well as mounting on the plurality of pressure sensing members a dispenser capable of discharging specific amounts of ingredients on specific anatomical regions of the animal.

In at least one aspect, a detection instrument may be used for detecting the presence and location of an animal foot. The detection instrument or detection instruments may be operatively connected to a data processing system and/or computer. One or more algorithms stored in a logic associated with the data processing system and/or computer provide programmable means to controlling discharge of ingredients on the foot of an animal.

In yet another aspect, the pressure sensing members are replaced by a plurality of compressibly resilient tubes connectable to a directional fluid check system or similar apparatus that refills the plurality of compressibly resilient tubes with selected ingredients. The weight of an animal, transmitted through one or more hooves to either the one or more of the compressibly resilient tubes, and/or to a mat that may cover the one or more of the compressibly resilient tubes, activates discharge of the ingredients. Alternatively, the compressibly resilient tubes may also be filled with a liquid or gas responsive to the weight of the animal, transmitted through one or more hooves, to the compressibly resilient tubes, thus activating discharge. A pressure switch connected to the compressibly resilient tubes as a detection instrument also may activate discharge of ingredients. The pressure switch could then send a signal to a computer or directly to a solenoid-actuated valve to allow the desired chemical solution to be applied to the correct anatomical region of the animal's foot.

In still another aspect, at least one overhead proximity sensor is provided, typically but not exclusively ultrasonic or photoelectric. The overhead proximity sensor tracks animal positions, and informs either or both of the data processing system and detection instruments an animal is in position to be treated by a discharge of ingredients.

The dispensers are constructed to deliver a focused stream of ingredients to each foot in response to the signals. In addition, the array of dispensers discharges ingredients in focused streams of ingredients in precise amounts during precise time periods selected by an operator of the system for treating animal feet. A tank is provided to hold ingredients to be discharged through the dispensers. The tank is in fluid communication with the array of dispensers. In addition, a pump is provided for conveying ingredients from the tank through the array of dispensers. A mat-flushing device also is included to remove debris from the foot treatment system during operation.

It will be apparent to one skilled in the art that the claimed subject matter as a whole, including the structure of the apparatus, and the cooperation of the elements of the apparatus, combine to result in a number of unexpected advantages and utilities. The structure and co-operation of structure of the animal treatment system will become apparent when read in conjunction with the following description, drawing figures, and appended claims.

The foregoing has outlined broadly the more important features of the animal treatment system to better understand the detailed description that follows, and to better understand the contributions to the art. The animal treatment system is not limited in application, however, to the details of construction, and to the arrangements of the components, provided in the following description or drawing figures, but is capable of other embodiments and aspects, and of being practiced and carried out in various ways. Accordingly, the phraseology and terminology employed in this disclosure are for purpose of description and therefore should not be regarded as limiting. As those skilled in the art will appreciate, the conception on which this disclosure is based readily may be used as a basis for designing other structures, methods, and systems. The claims, therefore, include equivalent constructions.

Further, the abstract associated with this disclosure is intended neither to define the system for treating animal feet, which is measured by the claims, nor intended to limit the scope of the claims. The novel features of the system for treating animal feet are best understood from the accompanying drawing, considered in connection with the accompanying description of the drawing, in which similar reference characters refer to similar parts, and in which:

BRIEF DESCRIPTION OF THE DRAWING

FIG. 1A of the drawing is a perspective view of a portion of the foot treatment system in an operative environment with a cow moving across the pads and array of dispensers of the system;

FIG. 5A is a combination perspective and diagrammatic illustration of one animal treatment unit of the animal treatment system;

FIG. 5B illustrates discharge of one of the streams of ingredients;

FIG. 5C is a perspective and diagrammatic illustration of another aspect of the system for treating animal feet;

Figure 1B:
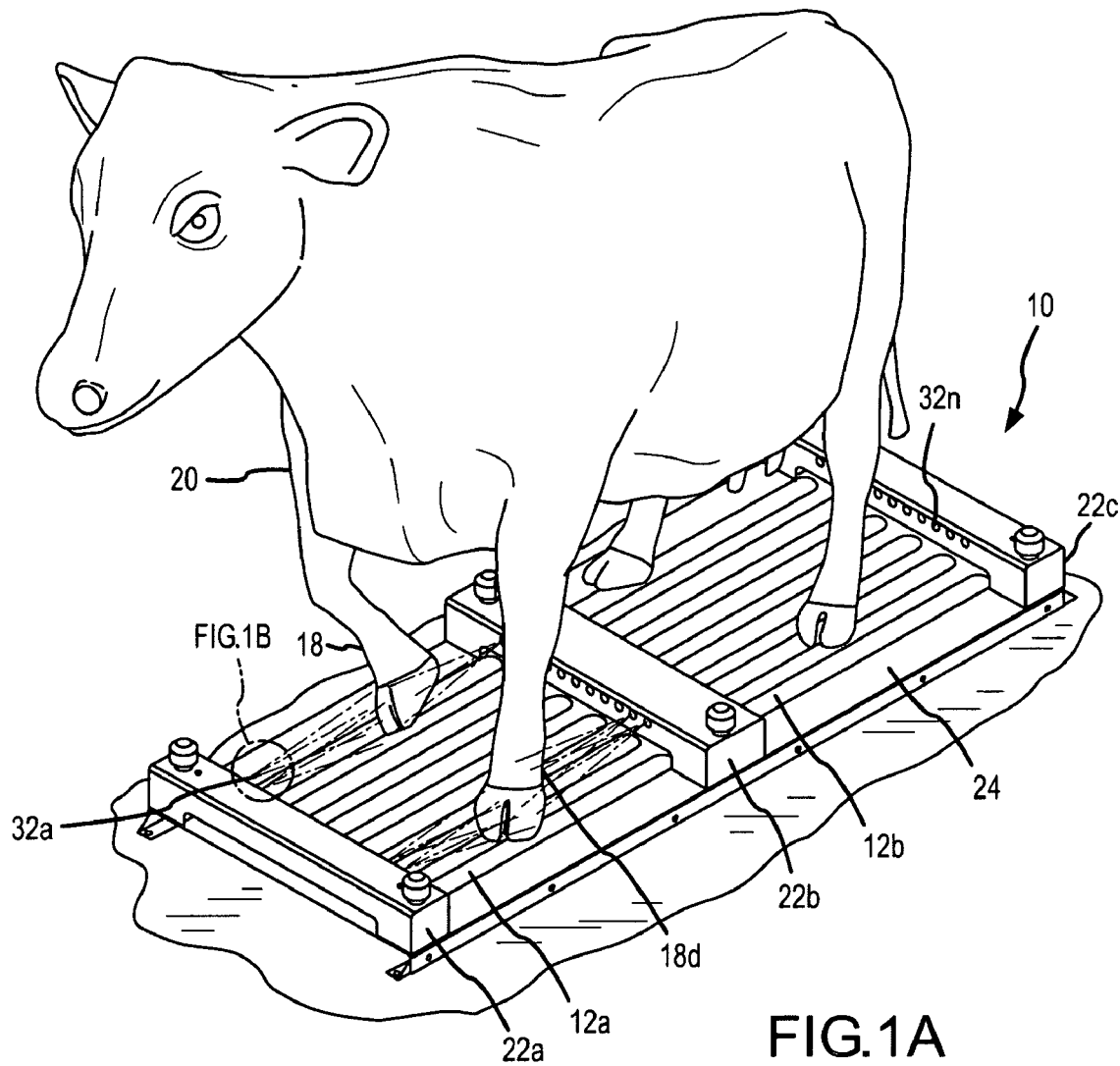
FIG. 1B is an expanded view of 1B in FIG. 1A showing a dispenser in operation.
Figure 1B:
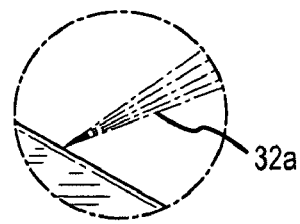

In the drawing figures and in the description, to the extent that the numerical designations in the drawing figures include lower case letters such as "a, b" such designations include multiple references, and the letter "n" in lower case such as "a-n" is intended to express a number of repetitions of the element designated by that numerical reference and subscripts.

DETAILED DESCRIPTION

Definitions

As used in this document, the term "foot" as used in this document means not only the terminal part of a vertebrate animal's leg, but also the hoof (the curved covering of horn that protects the front of the terminal part), the pad, the pastern, the dewclaw, the hock, and the portion of the leg below the knee or hock on an animal such as a domestic bovine.

The term "debris" means at least animal waste.

The term "ingredients" means any combination of active and inert chemicals and fluids, including water, that may be discharged from dispensers for treating animal foot problems including, without limitations, diseases, infections, abrasions, and injuries to a foot of an animal, as well as preventative ingredients including, for example, those useful for creating resistance to diseases and lacerations, for hardening hooves, and similar desirable treatments. For example, the ingredients may include buffered sulfuric acid, copper sulfate, soap surfactants, marking colored dies to confirm application of treatment on a foot, and water, among others that are used to treat animal foot problems.

The term "processor" includes but is not limited to a microprocessor (such as an integrated circuit containing a central processing unit of a computer on one or more chips, such that only the memory and input-output functionalities need be added), but also includes any device that may be programmed with instructions to conduct a sequence of operations leading to discharge of ingredients from dispensers. The term "processor," therefore may include a controller, digital signal processor, and other equivalent devices.

The term "signal" includes but is not limited to a detectable physical quantity, pulse or impulse, such as a voltage, current, or magnetic field strength, as well as mechanical means for activation.

The term "activate" includes but is not limited to discharging one or more ingredients during one or more desired time intervals, and "deactivate" includes the suspension or delay in discharging ingredients during one or more desired time intervals.

The term "focused" as used in the term "focused stream of ingredients" means a stream of ingredients discharged from the array of dispensers in a pattern of over 30 degrees from horizontal.

The term "animal" includes cattle, and thus both cows and steers, as well as other animals and mammals.

The term "wireless technology" means any of a number of operatively connected communication devices adapted to receive and transmit at least electromagnetic signals across the system without cables using infrared light and radio signals, and also includes a telecommunications system in which electromagnetic waves, rather than some form of wire, carry the signal over all or part of the communication path.

The term "detection instrument" means and includes any number of devises capable of detecting and responding to physical stimuli such as pressure, movement, light, heat and other stimuli, including, as nonexclusive examples, one or more sensors, compressively resilient tubes, detection switches, solenoids, and similar apparatus.

The term "delivery system" means described and alternative components of the animal treatment system that hold and transport ingredients to an animal foot.

The term "exemplary" means "serving as an example, instance, or illustration." Any aspect described in this document described as "exemplary" is not to be construed as preferred or advantageous over other aspects.

DESCRIPTION

As shown in FIGS. 1-8, and more specifically in FIGS. 1-4, a system for treating animal feet is provided that in its broadest context includes at least one mat. Each mat includes pressure-sensing plates capable of generating and sending signals to activate dispensers that discharge treatment ingredients on a foot when a foot either has applied pressure on the mat, or has been lifted from the mat. The dispensers and pressure sensing plates are operatively connected together to cause the dispensers to discharge the ingredients. The dispensers and pressure sensing plates also are operatively connected to a processor. The processor has the capability of processing signals from the pressure sensing plates in the mat to cause the dispensers to discharge a stream of ingredients in precise amounts during precise time periods. A tank for holding the ingredients also is provided, as well as a pump for delivering the ingredients through the system. A mat-flushing device also is included.

Figure 2A:
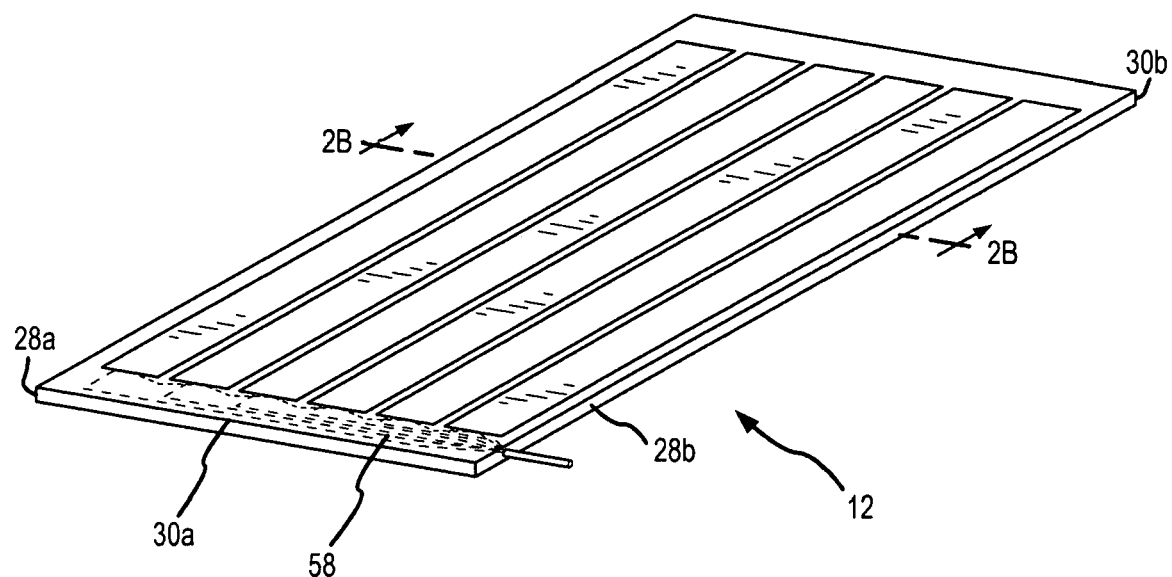
FIG. 2A is a perspective view of a pad as disclosed and claimed in this document.
Figure 2B:
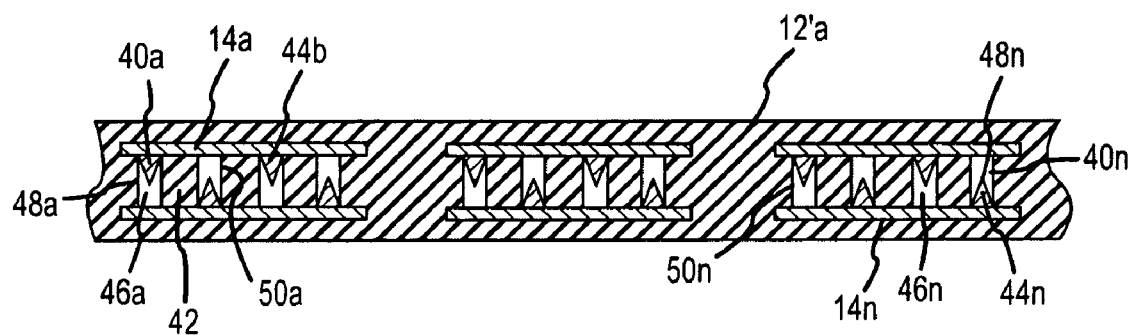
FIG. 2B is a cross-section view of the mat along the line 2B-2B in FIG. 2A showing one embodiment of the pressure sensing plates.
Figure 2C:
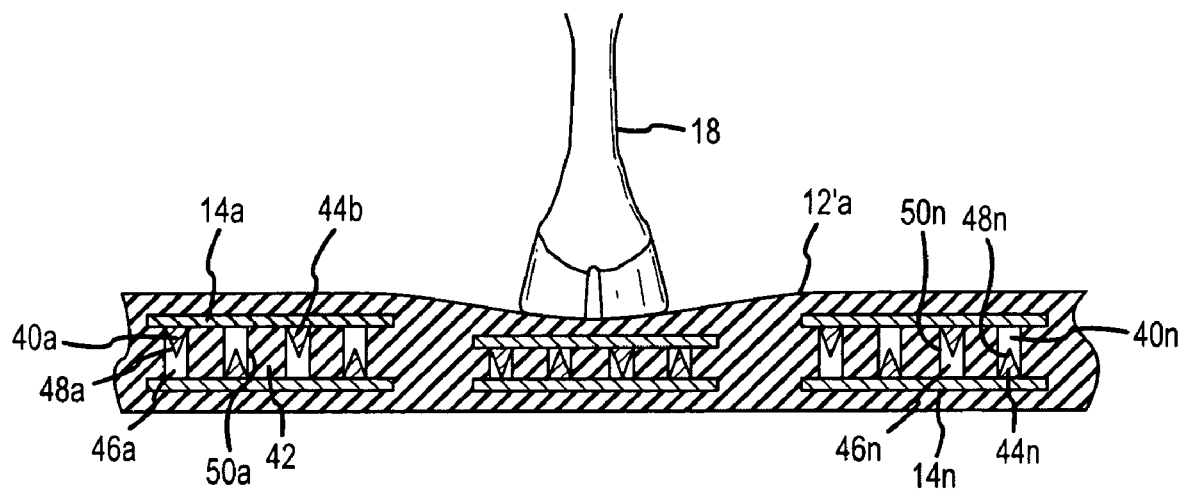
FIG. 2C is a cross-section of one embodiment of the pressure sensing plates after contact is made between the plates by application of foot pressure to the mat.
Figure 2D:
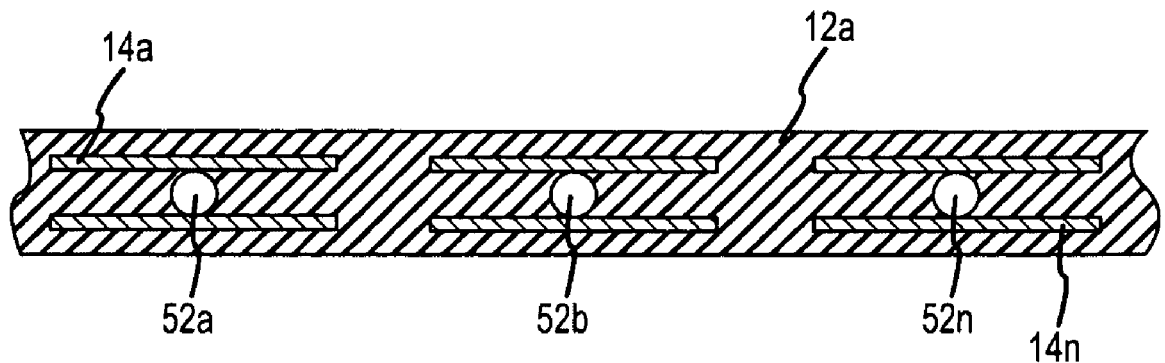
FIG. 2D is a cross-section view of the mat showing another embodiment of the pressure-sensing plates.
Figure 2E:
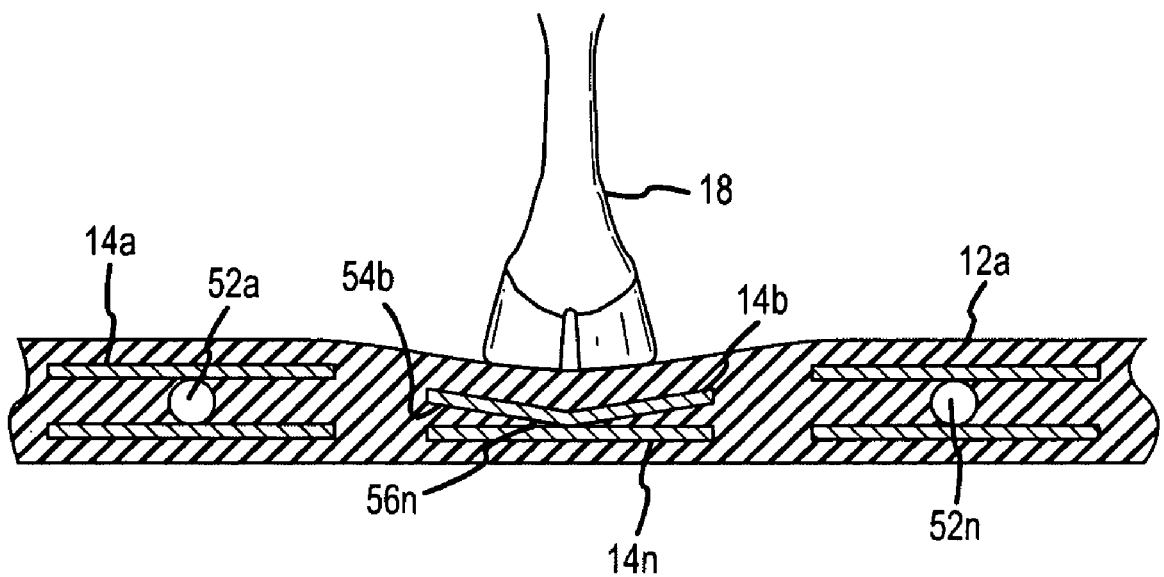
FIG. 2E is a cross-section view of the mat showing another embodiment of the pressure-sensing plates as shown in FIG. 2D after contact is made between the plates by application of foot pressure to the mat.
Figure 3:
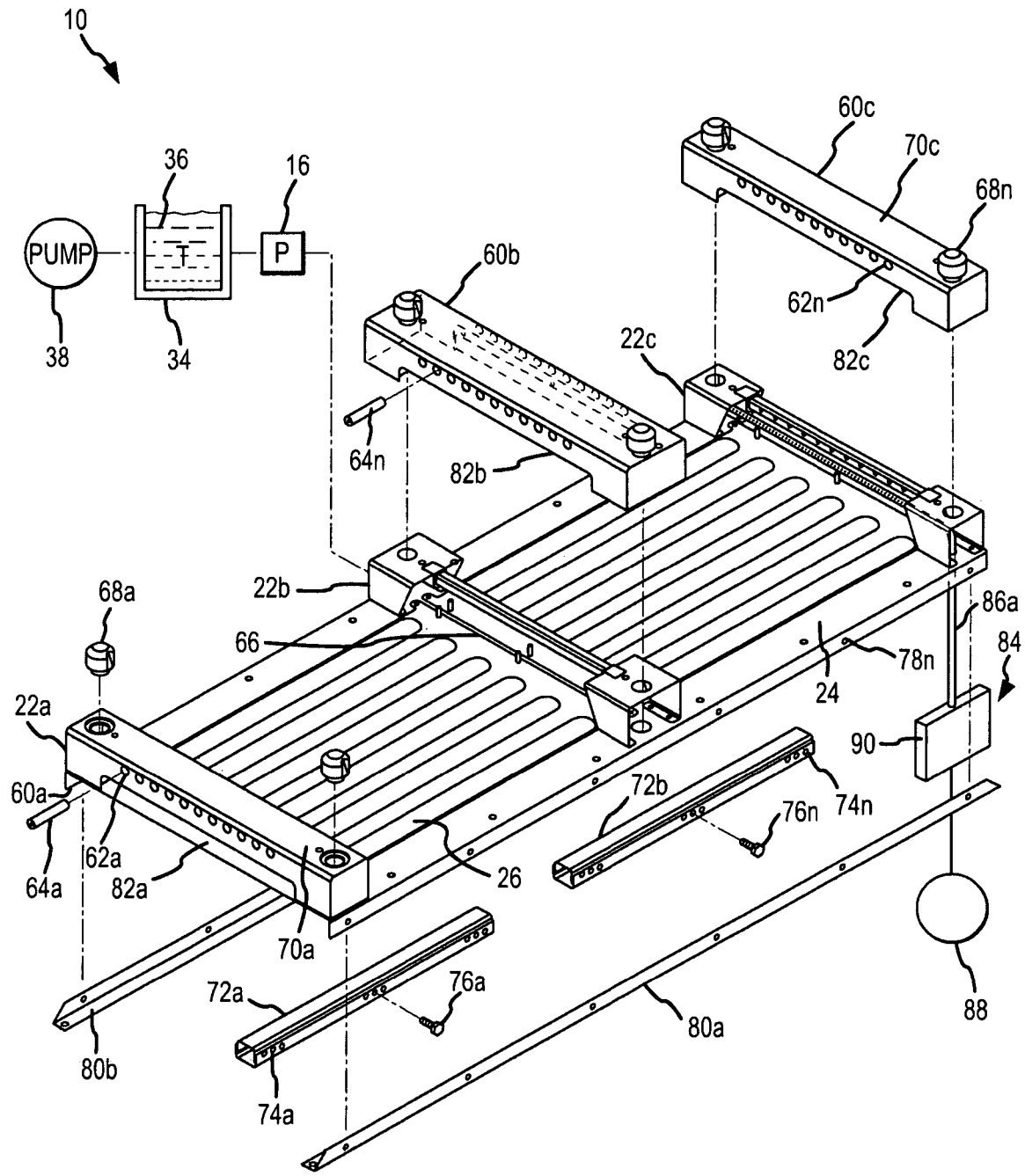
FIG. 3 is an exploded perspective view of selected components of the system for treating animal feet.
Figure 4:
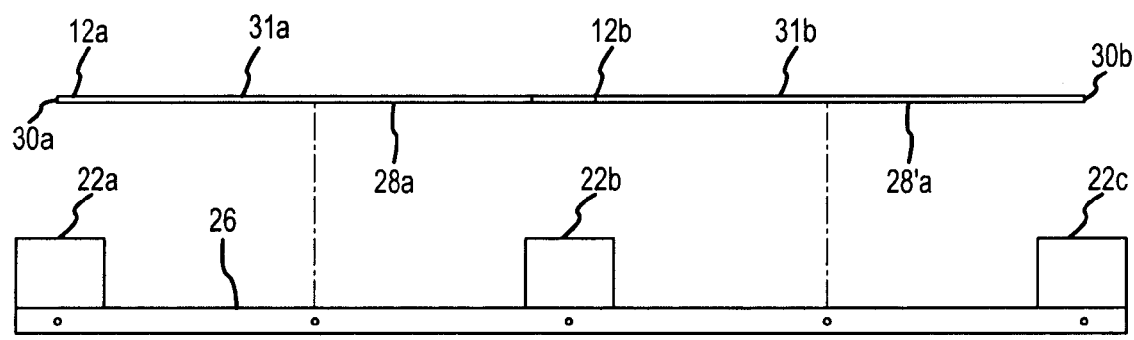
FIG. 4 also is a side view of the mats and the platform of the system for treating animal feet.

As shown by cross-reference between FIGS. 1-4, a system for treating animal feet 10 is provided. The system for treating animal feet 10 includes one or more mats 12a,b. In the embodiment shown in FIGS. 1-2E and 4, the one or more mats 12a,b are compressively resilient mats 12a,b. In the embodiments illustrated in FIGS. 2A-2E, the compressibly resilient material is PVC, but the material is not a limitation of the system for treating animal feet 10. In the embodiments shown by cross-reference between FIGS. 1-2E, the mats 12a,b include a plurality of pressure sensing plates 14a-n as best shown in FIGS. 1-2E and 4. In the embodiment illustrated in FIGS. 1-2E, the one or more mats 12a,b surroundingly contains the plurality of pressure sensing plates 14a-n. Each of the plurality of pressure sensing plates 14a-n is adapted to generate and send to a processor 16 one or more signals as shown in FIG. 3. The one or more signals is generated and sent by application of a foot 18 of an animal 20 to a mat 12a,b. In addition, one or more signals are generated and sent to processor 16 on removal of a foot 18 from the one or more mats 12a-b. At least one reason for providing one or more mats 12a,b instead of a single mat 12 as shown in FIG. 4, is to allow an operator of animal foot treatment system 10 to remove a possibly damaged mat 12a while continuing to operate system for treating animal feet 10 using the other mat 12b.

As shown diagrammatically in FIG. 3, system for treating animal feet 10 also includes processor 16. The processor 16 also is designated "P" and is operatively connected to the plurality of pressure sensing plates 14a-n in the one or more mats 12a,b. As also shown by cross-reference between FIGS. 1 and 3-4, the system for treating animal feet 10 also includes an array of dispensers 22a-c. The array of dispensers 22a-c is operatively connected to the plurality of pressure sensing plates 14a-n. The array of dispensers 22a-c also is operatively connected to the processor 16. In the embodiment shown by cross-reference between FIGS. 1 and 3-4, the array of dispensers 22a-c is mounted laterally across the one or more mats 12a,b, and the one or more mats 12a,b is mounted on a platform 24 best shown in FIG. 3. Thus, in the embodiment shown by cross-reference between FIGS. 3 and 4, the one or more mats 12a,b is mounted on the top surface 26 of platform 24. As also shown by cross-reference between FIGS. 2A-E and 4, the one or more mats 12a,b is formed with opposing sides 28a,b and opposing ends 30a,b. The array of dispensers 22a-c are mounted on the upper surface 31 of the one or more mats 12a,b laterally between the opposing sides 28a,b. The array of dispensers 22a-c is adapted to deliver to a foot 18 a focused stream of ingredients 32a-n as shown perhaps best in FIG. 1B. Further, the processor 16 is adapted to receive and process one or more signals from the one or more mats 12a,b and to thereby cause the array of dispensers 22a,c to discharge the focused stream of ingredients 32a-n in precise amounts during precise time periods.

In the embodiment illustrated in FIG. 3, the system for treating animal feet 10 also includes a tank 34 shown diagrammatically by the symbol "T" for holding ingredients 36 to be discharged on the foot 18 of an animal 20 from the array of dispensers 22a-c. The tank 34 is adapted to contain ingredients 36 in fluid communication with the array of dispensers 22a-c. In addition, a pump 38 is provided for conveying the ingredients 36 from the tank 34 to the array of dispensers 22a-c. The pump 38 also may mix the ingredients 36 in desired ratios for application through the system for treating animal feet 10 onto the foot 18 of an animal 20.

As further shown by cross-reference between FIGS. 2A-2E, the pressure-sensing plates 14a-n are surroundingly contained within the one or more mats 12a,b. In the embodiment illustrated by cross-reference between FIGS. 2B-2C, opposing pressure-sensing plates 14a-n include a plurality of electrically conductive members 40a-n that are separated by a portion of the material generally designated 42 used to construct the one or more mats 12a,b. In the embodiment illustrated in FIGS. 2B and 2C, the plurality of electrically conductive members 40a-n are shown to be a series of conical contacts 44a-n and a series of receptor contacts 46a-n formed with a plurality of conical indentations 48a-n into which the conical contacts 44a-n fit upon application of pressure by a foot 18 of an animal 20. The plurality of electrically conductive members 40a-n shown as a series of conical contacts 44*a-n* and a series of receptor contacts 46*a-n* formed with a plurality of conical indentations 48*a-n* into which the conical contacts 44*a-n* fit upon application of pressure by a foot 18 of an animal 20 are positioned within a chamber 50*a-n* formed in the portion of material 42 between opposing pressure-sensing plates 14*a-n*. Chamber 50*a-n* permits electrical contact and conductivity when the plurality of electrically conductive members 40*a-n* is placed in contact by pressure applied to a mat 12*a,b* by the foot 18 of an animal. As perhaps best shown in FIG. 2C, on application of pressure by a foot 18 to a mats 22*a,b*, the foot exerts pressure on the plurality of pressure sensing plates 14*a-n*, causing electrically conductive members between the plates to make contact, which in turn generates and sends one or more signals to the processor 16. The processor 16 is programmed to process a signal either on application of foot pressure to the one or more mats 12*a,b* or on removal of foot pressure from the one or more mat 12*a,b*, or both.

In the embodiment illustrated by cross-reference between FIGS. 2D-2E, a plurality of cavities 52*a-n* is formed during manufacture of mats 12*a,b*. Plurality of cavities 52*a-n* may be tubular, as shown by cross-section in FIGS. 2D and 2E, and may be formed to extend along the longitudinal axis of the one or more pressure-sensing plates 14*a-n*. During manufacture, plurality of cavities 52*a-n* is formed with a partial vacuum. After manufacture of mats 12*a,b*, a seal (not shown) is broken, collapsing the partial vacuum, and plurality of cavities 52*a-n* is substantially filled with a gas. In one non-exclusive example the gas is nitrogen. Nitrogen is, of course, relatively inert, is a constituent of all living tissue, and therefore harmless to an animal 20 if the gas should escape confinement from plurality of cavities 52*a-n*. As shown in FIG. 2E, when a foot 18 of animal 20 steps on a mat 12*a,b*, one of the pressure-sensing plates 14*b*, for example, depresses in the compressibly resilient material. The pressure applied by a foot 18 squeezes the gas-filled cavity, allowing lower side 54*a-n* of pressure-sensing plate 14*b*, for example, to make contact with upper side 56*a-n* of pressure-sensing plate 14*n*, thus generating a signal that is sent along lead lines 58 to processor 16, as shown in FIG. 2A. When the foot 18 of animal 20 is removed from the mat 12*a*, pressure-sensing plate 14*b* returns to its original configuration.

The signals generated by pressure-sensing plates 14*a-n* are sent to processor 16. Processor 16 in turn, activates the array of dispensers 22*a-c* shown perhaps best in FIG. 3. In the embodiment illustrated in FIG. 3, the array of dispensers 22*a-c* will be activated by the signals to discharge ingredients 36 on the foot 18 that has activated the array of dispensers 22*a-c* upon application of approximately twenty-five pounds per square inch by the foot 18.

As perhaps best shown by cross-reference between FIGS. 3-4, the array of dispensers 22*a-c* includes a housing 60*a-c*. The housing 60*a-c* is formed with a plurality of openings 62*a-n*. The plurality of openings 62*a-n* is provided to position a plurality of valves (not shown). The plurality of valves is adapted to demountably connect a plurality of emitters 64*a-n*. The plurality of valves and the plurality of emitters 64*a-n* are in fluid communication with a set of interconnected tubes 66*a-n* underlying the platform 24 and the mats 12*a,b*. The tubes 66*a-n* are adapted to deliver the ingredients 36 from the tank 34 via the pump 38 to the array of dispensers 22*a-c* for discharge of the ingredients 36 on the foot 18 of an animal 20.

In the embodiment illustrated in FIGS. 1A-4, the processor 16 is programmable to receive the one or more signals following application of a foot 18 on the one or more mats 12*a,b* by beginning a first desired time period during which the array of dispensers 22*a,c* refrains from discharging at least one focused stream of ingredients 32*a-n* on the foot 18. The processor 16 also is adapted and programmed to process the one or more signals following application of a foot 18 on a mat 12*a,b* by beginning a second desired time period during which the array of dispensers 22*a-c* discharges at least one focused stream of ingredients 32*a-n* on the foot 18.

Furthermore, the processor 16 is capable of processing the one or more signals following removal of a foot 18 from a mat 12*a,b* by beginning a third desired time period during which the array of dispensers 22*a-c* refrains from discharging at least one focused stream of ingredients 32*a-n* on the foot 18. In addition, the processor 16 is capable of processing the one or more signals following removal of a foot 18 from a mat 12*a,b* by beginning a fourth desired time period during which the array of dispensers 22*a-c* discharges a focused stream of ingredients 32*a-n* on the foot 18. The delays in discharge of ingredients 36 permit a user to apply specific ingredients to solve a specific problem.

The ability to program the processor 16 also allows an operator of the animal foot spraying system 10 to apply concentrated amounts of ingredients 36 for shorter times but more effectively, while achieving cost effective applications of ingredients 36 for treatment of animal foot problems. For example, on application of foot pressure on the one or more mats 12*a,b*, a 0.30 second delay may occur, followed by a 0.50-0.70-second first spray burst of a focused stream of ingredients 32*a-n* on the foot 18 of animal 20. Thereafter, as a foot 18 is removed from the one or more mats 12*a,b*, there may be a 0.15-0.30 second delay as the foot 18 is lifted from a mat 12*a,b*, followed by a discharge of a focused stream of ingredients 32*a-n* in precise amounts during the time period for about 0.15-0.30 second.

In the embodiment illustrated in FIG. 3, in addition to the array of dispensers 22*a-c* extending across the platform 24 of the animal foot spraying system 10, one or more spraying turrets 68*a-n* are mounted on the proximal outer surface 70*a-c* of one or more of the array of dispensers 22*a-c*. The one or more spraying turrets 68*a-c* are in fluid communication with the tubes 66*a-n* for discharging ingredients 36 on the foot 18 of an animal 20 and is operatively connected to the processor 16, the tank 34, and the pump 38.

As also best shown in FIG. 3, one or more legs 72*a,b* is provided. The one or more legs 72*a,b* are formed with a plurality of sets of variously positioned orifices 74*a-n*. The one or more sets of variously positioned orifices 74*a-n* permit an operator of the system for treating animal feet 10 to insert bolts 76*a-n* or similar connectors through holes 78*a-n* in the side flanges 80*a,b* of the platform 24 and into one or more of the variously positioned orifices 74*a-n* to adjust the height of the platform 24 relative to variations in the level of the surfaces on which the platform 24 is installed.

As also shown perhaps best in FIG. 3, the one or more housings 60*a-c* in the array of dispensers 22*a-c* is formed with a notch 82*a-c*. The notch 82*a-c* is provided to allow a mat-flushing device 84, shown diagrammatically in FIG. 3, to periodically emit water through notches 82*a-c* for flushing the animal foot spraying system 10 of debris. The mat-flushing device 84 is shown diagrammatically in FIG. 3 to include one or more pipes 86*a-n* connected to a source of water 88 and a timer 90 to repeatedly release a flow of water from the mat-flushing device 84 as and when an operator of the system for treating animal feet 10 desires.

As shown in FIGS. 1-4, the system for treating animal feet 10 includes no structural component adapted to enclose the mat or the platform to form a tub or bath for holding one or more ingredients.

While the system, apparatus and methods disclosed above have proven useful for the intended applications and advantages described in that document, additional contributions to the art disclosed, illustrated and claimed in this document provide other optimizations and embodiments in which the principles of operation, with different configurations, result in additional features, uses and applications for the animal treatment system disclosed, illustrated, and claimed in this document. In addition to overcoming at least the problems identified in the Background of this document, the animal treatment system solves numerous problems in the dairy herd management and husbandry industry because specific quantities of ingredients may be discharged and applied to specific anatomical regions of an animal in a comparatively cost-effective manner.

As illustrated in FIGS. 5A-8, in a broad aspect of the animal treatment system disclosed, illustrated and claimed in this document, an apparatus 100 is provided that includes at least two substantially parallel pressure sensing members 112a-n adapted to detect location of an animal foot 114a-n. The apparatus 100 also includes means connected to the at least two substantially parallel pressure sensing members 112a-n for discharging ingredients 130 on the foot 114a-n. Means also are provided for delivering the ingredients 130 to the means for discharging ingredients 130 on the foot 114a-n.

In another aspect, an animal foot treatment apparatus 100 includes a plurality of substantially parallel pressure sensing members 112a-n activated and deactivated in such a way that ingredients 130 are dischargeable on the animal foot 114a-n through at least one dispenser 102a-n. A delivery system 120, 128, and 132, connectable to the plurality of substantially parallel pressure sensing members 112a-n for delivering the ingredients 130 to the foot 114a-n also is included.

In yet another aspect, a hoof treatment system includes an array of dispensers 102a-n for discharging treatment ingredients 130 on the hoof 114a-n. In addition, a plurality of substantially parallel means 112a-n formed as a mat 12 connectable to the array of dispensers 102a-n for sensing location of the hoof 114a-n and for activating discharge of the treatment ingredients 130 on the hoof 114a-n is included. Also, means for holding and delivering the treatment ingredients 130 to the array of dispensers 102a-n is provided.

In still another aspect, a method providing a plurality of pressure sensing members 112a-n includes mounting on the plurality of pressure sensing members 112a-n a dispenser 102a for discharging ingredients 130 on a foot 114a-n placed on the plurality of pressure sensing members 112a-n. The method includes means for activating discharge of the ingredients 130 on the foot 114a-n. The method also includes connecting to the plurality of pressure sensing members 112a-n an ingredients delivery system 128 and 132.

In another aspect, a method of operating an animal treatment system includes providing a plurality of substantially parallel pressure sensing members 112a-n responsive to application of pressure from a foot 114a of the animal and responsive to removal of pressure from a foot 114a of an animal, as well as mounting on the plurality of pressure sensing members a dispenser 102a-n capable of discharging specific amounts of ingredients 130 on specific anatomical regions of the animal 106.

In at least one aspect, a detection instrument 118 may be used for detecting the presence and location of an animal foot 114a-n. The detection instrument 118 or detection instruments 118a-n may be operatively connected to a data processor 134 and/or computer. One or more algorithms stored in a logic associated with the data processing system 134 and/or computer provide executable and programmable means to control discharge of ingredients 130 on the foot of an animal 106.

Figure 5D:
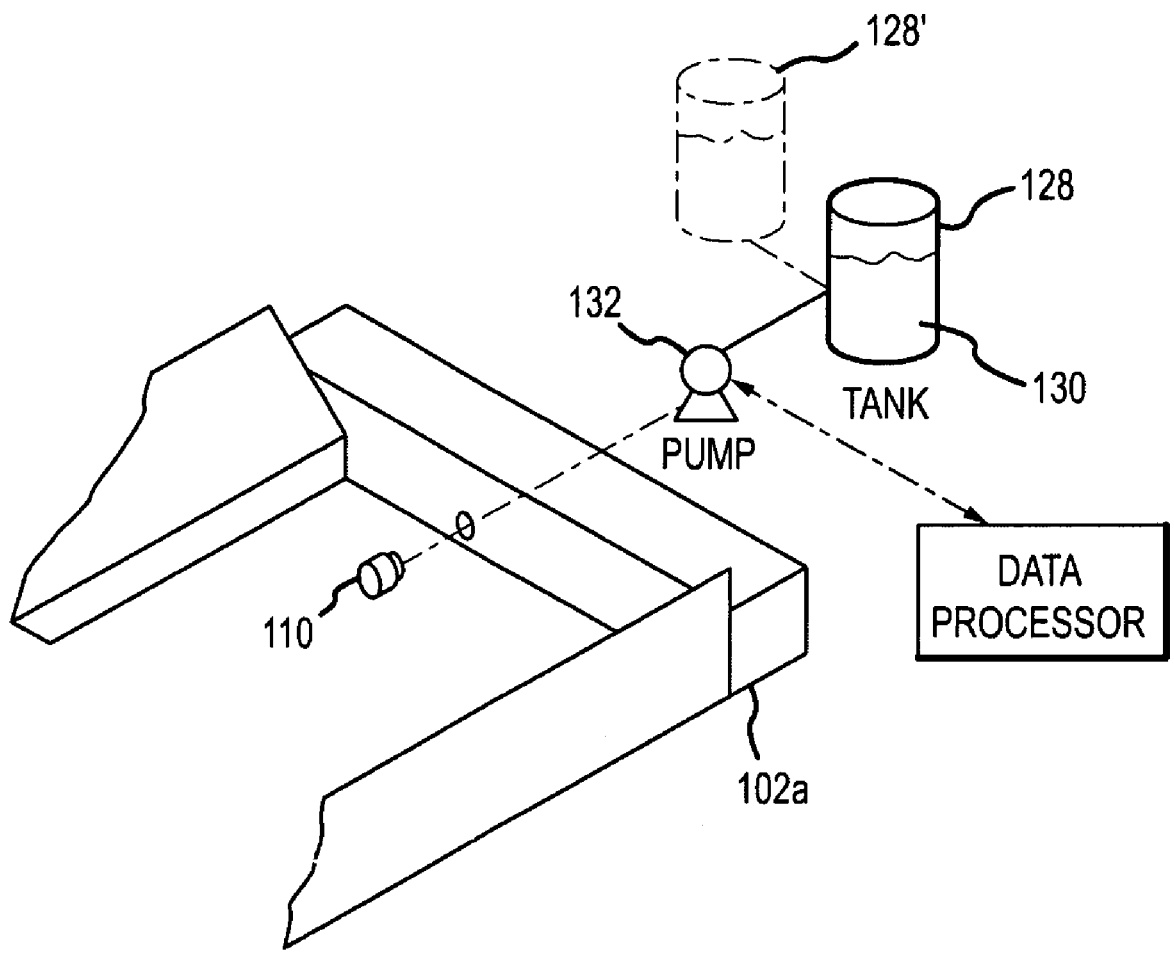
FIG. 5D is a combination perspective and diagrammatic illustration selected components of the animal treatment system.

As perhaps best illustrated by cross-reference between FIGS. 1-4, 5A and 5C, in one aspect the pressure sensing members 112a-n are embedded in a mat, preferably a compressibly resilient mat 12a,b as best shown in FIGS. 1-4; in another aspect, as illustrated in FIG. 5C, the pressure sensing members 112a-n are not necessarily embedded within a compressibly resilient mat 12a,b. In such an aspect, activation and deactivation of discharges of dispensers 102a-n occurs on application or removal of an animal foot 114a-n on at least one of the pressure sensing members 112a-n whether the pressure sensing members are or are not embedded in a compressibly resilient mat 12a,b.

In one aspect, algorithms stored in a logic either of a data processor 134, or in detection instruments 118a-n, are programmable in a number of ways. Accordingly, the animal treatment system 100 may be adjusted to delay discharge of ingredients 130 until an animal foot 114a-n is resting on one or more of the pressure sensing members 112a-n, and to discharge ingredients 130 in a specific amount for a specific time to solve a specific animal treatment problem or problems. Likewise, if an animal 106 pauses or stops for a predetermined excessive time period on one or more of the pressure sensing members 112a-n, the logic will signal the animal treatment system 100 to cease discharging.

Use of a timer 116, either alone or in combination with the pressure sensing members 112a-n, the detection instruments 118a-n, and/or the logic of the data processor 134 causes the animal treatment system 100 to discharge selected ingredients 130 on either the front or rear of a foot 114a-n, or both, depending on the desired treatment.

In yet another aspect of the animal treatment system, as perhaps best illustrated by cross-reference between FIGS. 1-4, 5A and particularly FIG. 5C, the pressure sensing members 112a-n are replaced by a plurality of compressibly resilient tubes 154a-n connectable to a directional fluid check system 156 or similar apparatus that refills the plurality of compressibly resilient tubes 154a-n with selected ingredients 130. The weight of an animal 106, transmitted through one or more hooves 114 to the mat 12a,b that may in one aspect contain the compressibly resilient tubes 154a-n, depresses one or more compressibly resilient tubes 154a-n, in turn causing the ingredients 130 to be discharged through the dispensers 102a-n.

In still another aspect, the animal treatment system includes at least one overhead proximity sensor, typically but not exclusively ultrasonic or photoelectric. The overhead proximity sensor 118b, tracks animal positions, and informs either or both of the data processor 134 and detection instruments 118a-n that specific anatomic regions of an animal 106 are in position to be treated by a discharge from a dispenser 102.

The dispensers 102a-n are constructed to deliver a stream of ingredients 130 to each foot 114a-n in response to detection instruments 118a-n. In addition, dispensers 102a-n may discharge ingredients 130 in focused streams of ingredients 130 in precise amounts during precise time periods selected by an operator of the system for treating animal feet 100. A tank 128 is provided to hold ingredients 130 to be discharged through the dispensers 102a-n. The tank 128 is in fluid communication with the array of dispensers 102a-n. In addition, a pump 132 is provided for conveying ingredients 130 from the tank 128 through the array of dispensers 102a-n. A mat-flushing device (not shown) also is included to remove debris from the foot treatment system 100 during operation.

As illustrated by cross-reference between FIGS. 1A-2E and 5A-5C, in an aspect of the animal treatment system 100, the plurality of pressure sensing members 112a-n is embedded in a compressively resilient mat 12 which surroundingly contains the plurality of pressure sensing members 112a-n. As indicated, however, and as illustrated in FIG. 5C, in another aspect no mat is provided with animal treatment system 100, and the plurality of pressure sensing members 112a-n is exposed to contact by the foot 114a-n of an animal 106 traversing or passing through the animal treatment system 100. In one nonexclusive example of the latter instance, and as illustrated in FIG. 5C, the pressure sensing members 112a-n may be compressibly resilient tubes 154a-n as illustrated in FIG. 5C. The compressibly resilient tubes 154a-n are connectable to a directional fluid check system 156 or similar apparatus that refills the plurality of compressibly resilient tubes 154a-n with ingredients 130. The weight of an animal, transmitted through one or more hooves 114a-n either to the one or more compressibly resilient tubes 154a-n, and/or to a mat 12 associated with the one or more compressibly resilient tubes 154a-n, activates discharge of the ingredients 130. Alternatively, the compressibly resilient tubes may also be filled with a liquid or gas responsive to the weight of the animal 106, transmitted through one or more hooves 114a-n, to the compressibly resilient tubes 154a-n, thus activating discharge of ingredients 130. A pressure switch 158 operatively connected to the compressibly resilient tubes 154a-n as a detection instrument 118 also may activate discharge of ingredients 130. The pressure switch 158 is selected to send at least a signal to a data processor 120 or directly to a solenoid-actuated valve (not shown) to allow the desired chemical solution of the ingredients to be applied to the correct anatomical region of the animal's foot 114a-n.

In addition, the animal treatment system 100 includes a timer 116, as illustrated best in FIG. 7A, which determines what days of the week and what times of the day the system is active for operation. The timer 116 is capable of acting as a scheduling device. The timer 116 is adapted to control discharges of one or more streams of ingredients 108a-n on the selected anatomical regions 104a-n of an animal 106.

In an aspect of the animal treatment system 100, one or more detection instruments 118a-n is included. The one or more detection instruments 118a-n may be positionable on the animal treatment system 100, or, alternatively, positioned above the head or body of an animal 106 as it proceeds through the animal treatment system 100, as illustrated best in FIG. 7B. The one or more detection instruments 118a-n is adapted to transmit animal position data to a data processor to be discussed more completely below.

Figure 6:
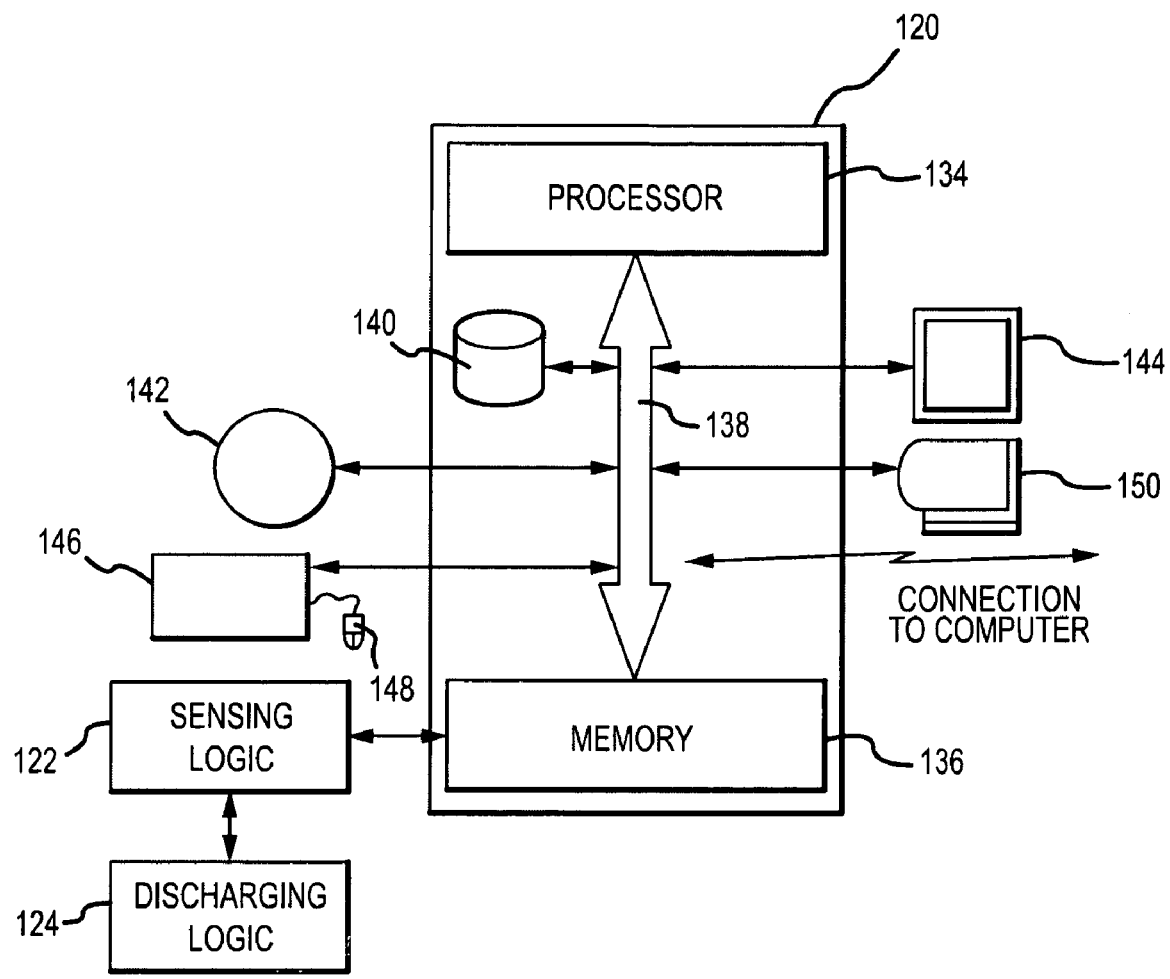
FIG. 6 is a diagrammatic illustration of a data processor and a range of associated components that are usable in the animal treatment system.
Figure 7:
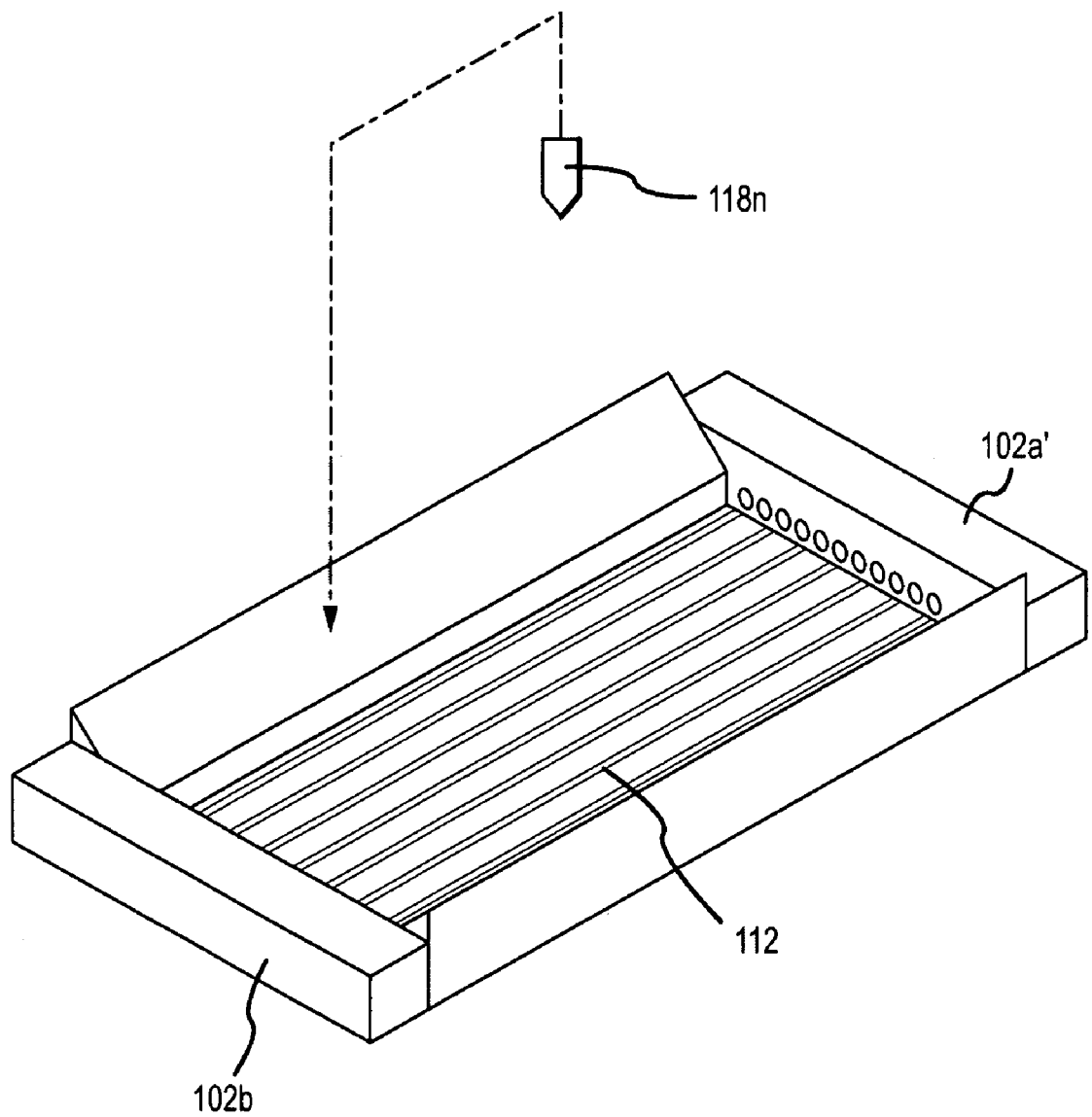
FIG. 7 is a combination perspective and diagrammatic illustration of one animal treatment unit of the animal treatment system.

As indicated, a data processor 120 is included in the animal treatment system 100, as illustrated by cross-reference between FIGS. 5A and 6. The data processor 120 is operatively connectable to the plurality of pressure sensing members 112a-n and to the array of dispensers 102a,b. The data processor 120 is capable of collecting, storing, processing and transmitting data and information generated by application of pressure to one or more of the plurality of pressure sensing members 112a-n. The data and information activates and deactivates a discharge of the one or more streams of ingredients 108a-n from the array of dispensers 102a,b. The plurality of pressure sensing members 112a-n also deactivate discharge of the one or more streams of ingredients 108a-n on removal of application of an animal foot 114a-n, and consequent pressure, on a selected number of the plurality of pressure sensing members 112a-n. The data processor 120 included with the animal treatment system 100 also includes sensing logic 122 and discharging logic 124. The sensing logic 122 is adapted to sense and transmit signals to the array of dispensers 102a,b in response to application of pressure, or removal of the application of pressure, from the plurality of pressure sensing members 112a-n. The discharging logic 124 is adapted to sense and transmit signals to the array of dispensers in response to data received by the sensing logic 122. The data processor 120 may be housed in a computer 126 that is operatively connectable to the data processor 120.

The data processing system 120 as illustrated in a non-exclusive example in the block diagram of FIG. 6 may include a variety of components to enable the animal treatment system 100 to receive, process, store, and transmit data and information to activate the array of dispensers and other components of the animal treatment system 100, including a processor 134, memory 136, the processor 134 and memory connected by a bus 138. Memory 136 is a relatively high-speed machine-readable medium and includes volatile memories such as DRAM, and SRAM, as well as non-volatile memories such as ROM, FLASH, EPROM, EEPROM, and bubble memory. Also connectable to the bus 138 are optional secondary storage 140, external storage 142, output devices such as a monitor 144 that may be connected to computer 126 and in optional configurations an input device such as a keyboard 146 with a mouse 148, and perhaps even a printer 150. Secondary storage 140 may include machine-readable media such as a hard disk drive, a magnetic drum, and a bubble memory. External storage 142 may include machine-readable media such as a floppy disk, a removable hard drive, a magnetic tape, CD-ROM, and even other computers connected via a communications line. The distinction between secondary storage 140 and external storage 142 is primarily for convenience in description. As such, a person skilled in the art will appreciate that there is substantial functional overlap between and among the components. Computer software and user programs can be stored in a software storage medium such as memory 136, secondary storage 140, and external storage 142. Executable versions of computer software can be read from a storage medium such as non-volatile memory, loaded for execution directly into volatile memory, executed directly out of non-volatile memory, or stored on the secondary storage 140 prior to loading into volatile memory for execution.

In addition, those skilled in the art also will appreciate that the various illustrative logical blocks, modules, circuits, and algorithm steps described in connection with aspects of the invention disclosed in this document may be implemented as electronic hardware, computer software, or combination of both. To clearly illustrate this interchangeability of hardware and software, various illustrative and non-exclusive components, blocks, modules, circuits, and steps have been described in this document generally in terms of their functionality. Whether such functionality is implemented as hardware or software depends on the particular application and design constraints imposed on an overall system. Skilled artisans may implement the described functionality in varying ways for each particular application, but such implementation decisions should not be interpreted as causing a departure from the scope of the present invention.

The various illustrative logical blocks, modules, and circuits described in connection with the aspects disclosed in this document may be implemented or performed with a general purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices such as, in a non-exclusive example, a combination of a DSP and a microprocessor, a plurality of microprocessors, one or more microprocessors in conjunction with a DSP core, or any other such configuration.

In addition, as shown in FIGS. 5A and 6, the algorithm of the logic associated with the data processor 120 is illustrated diagrammatically, and is programmed to process no fewer than a number of combinations and permutations of selectable output, or selectable applications of ingredients 130. Thus, while the compression of two (2) pressure sensing members 112a-n is often sufficient, compression of more than three (3) pressure sensing members 112a-n may signal a possible malfunction. As a person skilled in the art will appreciate, dairy cattle are milked two to three times daily. Given the number of logic alternatives, each time a cow is milked and moved through the animal treatment system 100, the program may be adjusted to treat different problems and different regions of the cow's anatomy. Each time the application of ingredients 130 may be fine tuned to treat a specific problem. In one non-exclusive example, dermatitis in cattle occurs on the back of a hoof. That specific problem may be treated in a first, second, or third passage of a cow through the animal treatment system 100. The result is a cost-effective, efficient, and confirmed application of the ingredients to address a specific problem.

A tank 128 is provided with the animal treatment system 100, as illustrated best in FIG. 5C. The tank 128 contains the ingredients 130 in fluid communication with the array of dispensers 102a,b. The ingredients 130 are delivered from the tank 128 to the array of dispensers 102a,b by a pump 132. The pump 132 is operatively connectable to the data processor 120 and to the computer 126, and is adapted to discharge specific amounts of the ingredients 130 as part of one or more streams of ingredients 108a-n directed to a specific anatomical region 104a-n of the animal's body 106.

In one exemplary aspect eleven (11) pressure sensing members 112a-n are deployed in a mat approximately 20-21" wide in a unit having a width of approximately 28-29". As a person skilled in the art will appreciate, however, the dimensions as recited are not a limitation of this disclosure. The inventor observed, however, that use of the eleven pressure sensing members 112a-n accommodated the range of dimensional variance among hooves on feet 114a-d of cattle. A narrow hoof, or foot, will compress at least three pressure sensing members 112a-c, whereas a wider hoof will compress more. Studies have shown that compression of at least three pressure sensing members 112a-c will achieve a confirmed impact of the discharge of ingredients 130 by combining the discharges substantially at the center of a cow's hoof. Calculations also reveal that the logic or algorithm associated with the animal treatment system 100 should be responsive to approximately 2,048 combinations and permutations of possible applications of ingredients 130 during passages of an animal or animals through the animal treatment system 100 of a group of cattle.

Another advantage arises from the ability to combine chemicals and other fluids as ingredients 130 that may be discharged from separate jets that combine on impact on an animal's anatomical region 104a-n, thus avoiding clogging and jamming that may occur if all ingredients 130 are mixed in a separate reservoir or container.

The system 100 allows a user to adjustably set the spray pattern(s) to solve a particular problem in a particular area of a portion of the anatomy of the animal 106. The geometry of the spray pattern can be tightened; the substantially circular impact of the spray on a target area 104a-n can be reduced, which reduces the cost of the application and increases the likelihood of an effective treatment application. As a person skilled in the art will appreciate, when the system is used to direct applications of ingredients 130 on feet 114a-d and hooves of a cow, a tight spray pattern is sufficient to apply ingredients 130 in a cost-effective manner because a substantially longitudinal gutter naturally is formed on either side of the hamstring of a cow above the hoof. Precisely targeted applications of ingredients that impact the anatomical region 104a-n identified as a gutter will flow downward with the aid of gravity, thus preventing or curing heel bulbs. The system 100 also provides a user with the ability to accurately target an area 104a-n on an animal 106. In conventional spray systems, if a cow stops, pauses, speeds up during passage through a chemical application system, such a system cannot adjust for such pauses or movements.

As illustrated in FIG. 5A, in at least one aspect of the animal treatment system 100 an array of dispensers 102a,b is mounted at opposing ends of the system 100 without an intermediary dispenser located between the array of dispensers 102a,b (in this document, "an intermediate dispenser"). Studies have indicated that the presumption that application coverage would be incomplete unless an intermediate dispenser is present proved incorrect. Elimination of the intermediate dispenser also contributes to the cost-effective application of ingredients by reducing the amount of expensive chemicals applied by the system. Not including an intermediate dispenser also removes what appear to cows as a barrier to passage.

As illustrated in FIG. 5C, the animal treatment system 100 is provided without a mat 12 in which detectors are housed. A protective mat may be included in the system 100 (not shown), but operates to protect the system 100 components from rocks and other items that might interrupt operation of the system 100. As illustrated in FIG. 5C, instead of embedding one or more pressure sensing members 112a-n within a mat 12, studies have confirmed that pressure sensing members 112a-n may be made sufficiently strong to resist damage by the application of pressure directly to the pressure sensing members 112a-n. Such an arrangement, with the pressure sensing members 112a-n not embedded within a mat 12, also aids in making any repairs to the system 100 faster and therefore more cost effective.

Figure 8:
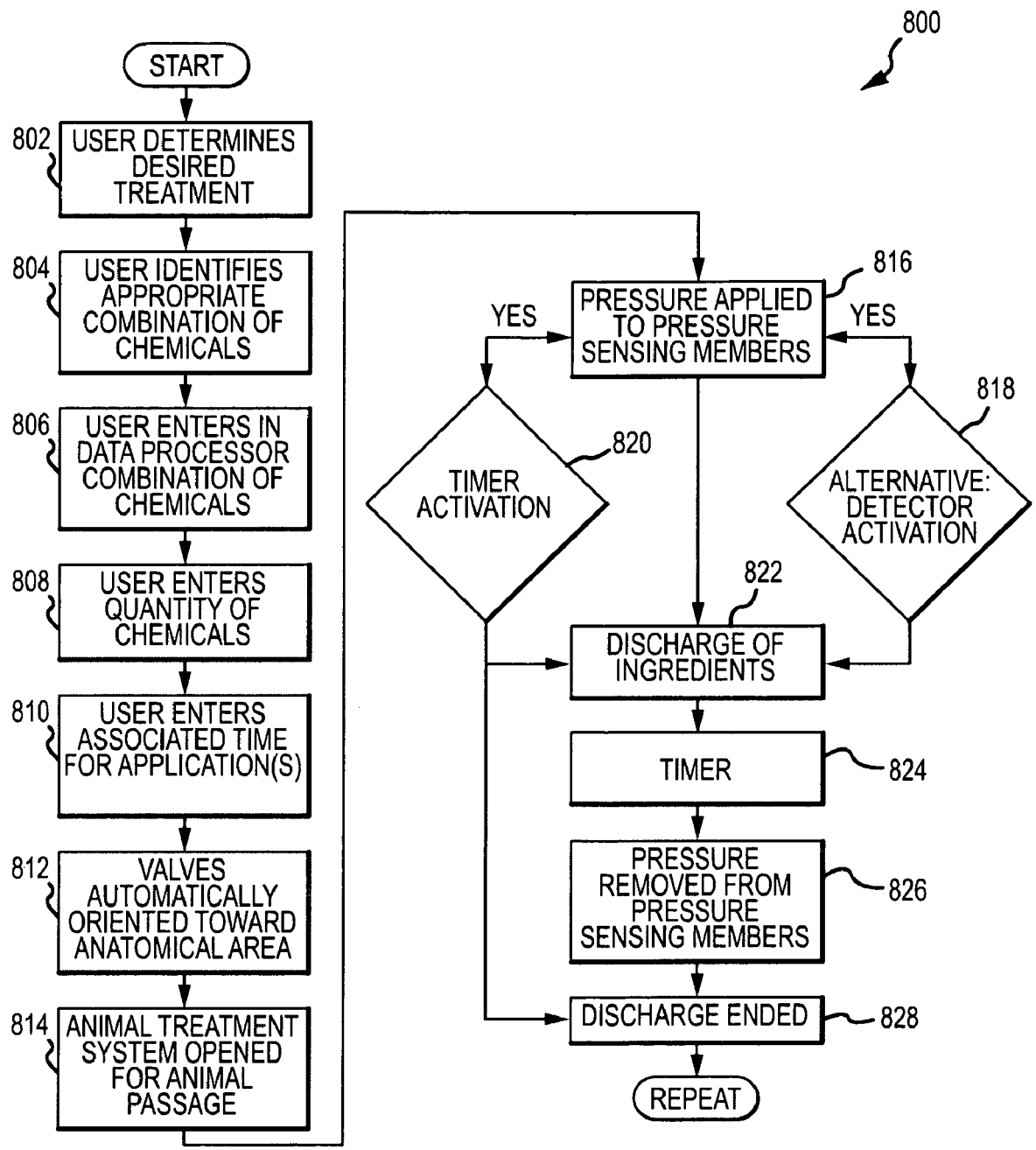
FIG. 8 is a flow chart illustrating steps in one aspect of a method of operating the animal treatment system.

A method of operating the animal treatment system 100 is summarized by a flow chart 800 as illustrated in FIG. 8. The steps of the method of operating the animal treatment system are as follows: at block 802 a user of the animal treatment system first determines a desired treatment for a specific problem to be treated. Subsequently, as indicated by block 804, the user identifies the appropriate combination of chemicals to form the ingredients that will be part of the one or more streams of ingredients to be directed from the system to a specific anatomical region of an animal's body. The user then enters the data and information about the appropriate combination of chemicals into the computer which is operatively connected to a data processor. As indicated, the data processor is capable of collecting, storing, processing and transmitting the data to activate operation of the animal treatment system on receipt of a signal that pressure has been applied to one or more of the plurality of pressure sensing members that in turn are operatively connectable to the array of dispensers. Likewise, as indicated at block 808, the user may enter data pertaining to the precise quantity of each of the chemicals comprising the combination of chemicals to be discharged in the one or more streams of ingredients. In addition, in at least one aspect of the animal treatment system, the user is able to enter time associated with the specific application of chemicals to be discharged on the specific anatomical region of an animal. As a result of the user entries in blocks 804-910, the valves associated with the array of dispensers automatically are oriented and aligned toward the anatomical region. Because the data processor includes a program responsive to a vast number of combinations and permutations of possible discharges of ingredients, on application of an animal foot to a predetermined number of the plurality of pressure sensing members, the valves further automatically orient toward the now known specific anatomical region to be treated. At block 814 the user is able to open the animal treatment system for passage of an animal through the animal treatment system. As indicated above, when pressure is applied to a preselected number of pressure sensing members, as indicated at block 816, discharge of ingredients occurs as indicated at block 822. As also indicated at block 816, in addition to pressure applied to the pressure sensing members, or in the alternative, by activation of the animal treatment system by one or more detectors as indicated at block 818, a discharge of ingredients as shown by block 822 occurs.

In addition, as also shown at blocks 816-820, a timer is activated to establish a time interval during which the one or more discharges of one or more streams of ingredients takes place. As the animal moves through the animal treatment system, pressure applied to the plurality of pressure sensing members is removed as one or more feet are removed from the pressure sensing members. Accordingly, at block 824, discharge from the animal treatment system ceases on removal of pressure from the plurality of pressure sensing members. Block 826 indicates that discharge has ended. However, the method of operating the animal treatment system may be repeated. Alternatively, the animal may enter into a second unit, where the method of operating the animal treatment system begins anew using different chemical applications to solve different animal treatment problems.

Claim elements and steps in this document have been numbered solely as an aid in understanding the description. The numbering is not intended to, and should not be considered as intending to, indicate the ordering of elements and steps in the claims. In addition, the system for treating animal feet shown in drawing FIGS. 1A through 8 shows at least one aspect that is not intended to be exclusive, but merely illustrative of the disclosed embodiments. Means-plus-function clauses in the claims are intended to cover the structures described as performing the recited function that include not only structural equivalents, but also equivalent structures.

What is claimed is:

1. An apparatus, comprising:
   at least two substantially parallel pressure sensing members adapted to detect a location of an animal foot to activate means connected to the at least two substantially parallel pressure sensing members for discharging ingredients on a specific anatomical region of the foot;
   means for delivering the ingredients to the means for discharging ingredients on the specific anatomical region of the foot; and
   a mat adapted to position and to surroundingly contain the at least two substantially parallel pressure sensing members.

2. An apparatus as recited in claim 1, further comprising means for detecting adapted to detect at least location of the foot in relation to the at least two substantially parallel pressure sensing members.

3. An apparatus as recited in claim 1, wherein the means for discharging ingredients on the foot connected to the pressure sensing members includes an array of dispensers.

4. An apparatus as recited in claim 1 wherein the means for discharging ingredients on the foot connected to the pressure sensing members includes a data processor operatively connectable to the at least two pressure sensing members and to the array of dispensers,
   wherein the data processor is adapted to collect, store, process and transmit data and information from the plurality of pressure sensing members to activate and deactivate the discharge of the ingredients.

5. An apparatus as recited in claim 4, wherein the means connected to the pressure sensing members for delivering ingredients on the foot includes a computer operatively connectable to the data processor.

6. An apparatus as recited in claim 1, wherein the means for delivering ingredients on the foot includes a tank adapted to hold the ingredients.

7. An apparatus as recited in claim 1, wherein the means for delivering ingredients on the foot includes a pump in fluid communication with the tank.

8. An apparatus as recited in claim 1, further comprising a flushing device adapted to remove debris from the apparatus.

9. A hoof treatment system, comprising:
   an array of dispensers for discharging treatment ingredients on the hoof;
   a plurality of substantially parallel means formed as a mat connectable to the array of dispensers for sensing location of the hoof and for activating discharge of the treatment ingredients on a specific anatomical region of the hoof;
   wherein the plurality of substantially parallel means for sensing location of the hoof and for activating discharge of the treatment ingredients on the hoof includes one or more computers operatively connectable to one or more data processors; and
   means for holding and delivering the treatment ingredients from the array of dispensers to the specific anatomical region of the hoof, the specific anatomical region being computer-selectable.

10. A hoof treatment system as recited in claim 9, wherein the plurality of substantially parallel means for sensing location of the hoof and for activating discharge of the treatment ingredients on the hoof includes one or more detection instruments.

11. A hoof treatment system as recited in claim 10, wherein the plurality of substantially parallel means for sensing location of the hoof and for activating discharge of the treatment ingredients on the hoof includes the one or more data processors.

12. A hoof treatment system as recited in claim 9, wherein the means for holding and delivering the treatment ingredients from the array of dispensers includes a tank for holding the treatment ingredients.

13. A hoof treatment system as recited in claim 12, wherein the means for holding and delivering the treatment ingredients from the array of dispensers includes a pump in fluid communication with the tank for delivering the treatment ingredients to the array of dispensers.

14. A method of treating an animal foot, comprising:
   providing a plurality of substantially parallel pressure sensing members capable of sensing the location of an animal foot;
   mounting on the plurality of pressure sensing members a dispenser for discharging ingredients on a specific anatomical region of the animal foot placed on the plurality of pressure sensing members, and further positioning the plurality of pressure sensing members as a first mat, and further surroundingly positioning the plurality of pressure sensing members within a second mat;

including means for activating discharge of the ingredients on the specific anatomical region of the animal foot; and connecting to the plurality of pressure sensing members an ingredients delivery system.

15. A method as recited in claim 14, further mounting on the plurality of pressure sensing members a detection instrument for detecting the location of the foot placed on the plurality of pressure sensing members.

16. A method as recited in claim 15, further equipping the ingredients delivery system with:

a data processor; and at least one of either a data processor and means for collecting, storing, processing and transmitting instructions to activate and deactivate discharge of the ingredients on the foot.

17. A method as recited in claim 15, further equipping the ingredients delivery system with:

a tank for holding the ingredients in fluid communication with the plurality of pressure sensing members; and a pump in fluid communication with the tank for delivering the ingredients to the dispenser.

* * * * *